US007007282B1

(12) United States Patent
Lee et al.

(10) Patent No.: US 7,007,282 B1
(45) Date of Patent: Feb. 28, 2006

(54) SLAVE DEVICE AND DATA SHARING METHOD

(75) Inventors: Jin-woo Lee, Seoul (KR); Hyung-gi Kim, Seoul (KR); Jong-dae Kim, Kwacheon (KR); Yoon-soo Kim, Seongnam (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 495 days.

(21) Appl. No.: 09/597,702

(22) Filed: Jun. 19, 2000

(30) Foreign Application Priority Data

Jun. 19, 1999 (KR) .............................. 1999-23122

(51) Int. Cl.
*G06F 13/10* (2006.01)

(52) U.S. Cl. ..................................... 719/321
(58) Field of Classification Search ............... 709/321; 719/310, 321
See application file for complete search history.

(56) References Cited

U.S. PATENT DOCUMENTS

| | | | | |
|---|---|---|---|---|
| 5,463,772 A | * | 10/1995 | Thompson et al. | 707/101 |
| 5,802,307 A | * | 9/1998 | Melo | 709/232 |
| 5,815,426 A | * | 9/1998 | Jigour et al. | 365/51 |
| 5,838,910 A | * | 11/1998 | Domenikos et al. | 709/203 |
| 5,894,557 A | * | 4/1999 | Bade et al. | 709/228 |
| 6,026,402 A | * | 2/2000 | Vossen et al. | 707/9 |
| 6,348,933 B1 | * | 2/2002 | Walls et al. | 345/744 |

OTHER PUBLICATIONS

Understanding the Flash Translation Layer(FTL) Specification, intel Corporation 1997, 1998, p. 1-20.*
FS, The Worlflow Application Architecture, 1999.*

* cited by examiner

*Primary Examiner*—W. Thomson
*Assistant Examiner*—LeChi Truong
(74) *Attorney, Agent, or Firm*—Sughrue Mion, PLLC

(57) ABSTRACT

A slave device, which is connected to the file system of a host device and shares a storage device with the host device, and a data sharing method between the host device and the slave device are provided. The slave device has a storage device and is connected to the host device through a predetermined coupling device. The slave device includes a media driver for performing connection to a file system of the host device according to a predetermined protocol such that at least part of the storage device operates as a storage device of the host device. Accordingly, the storage device within the slave device operates as the storage device of the host device in a universal application program of the host device, thereby allowing the host and slave devices to share at least part of the storage device of the slave device using a universal application.

16 Claims, 4 Drawing Sheets

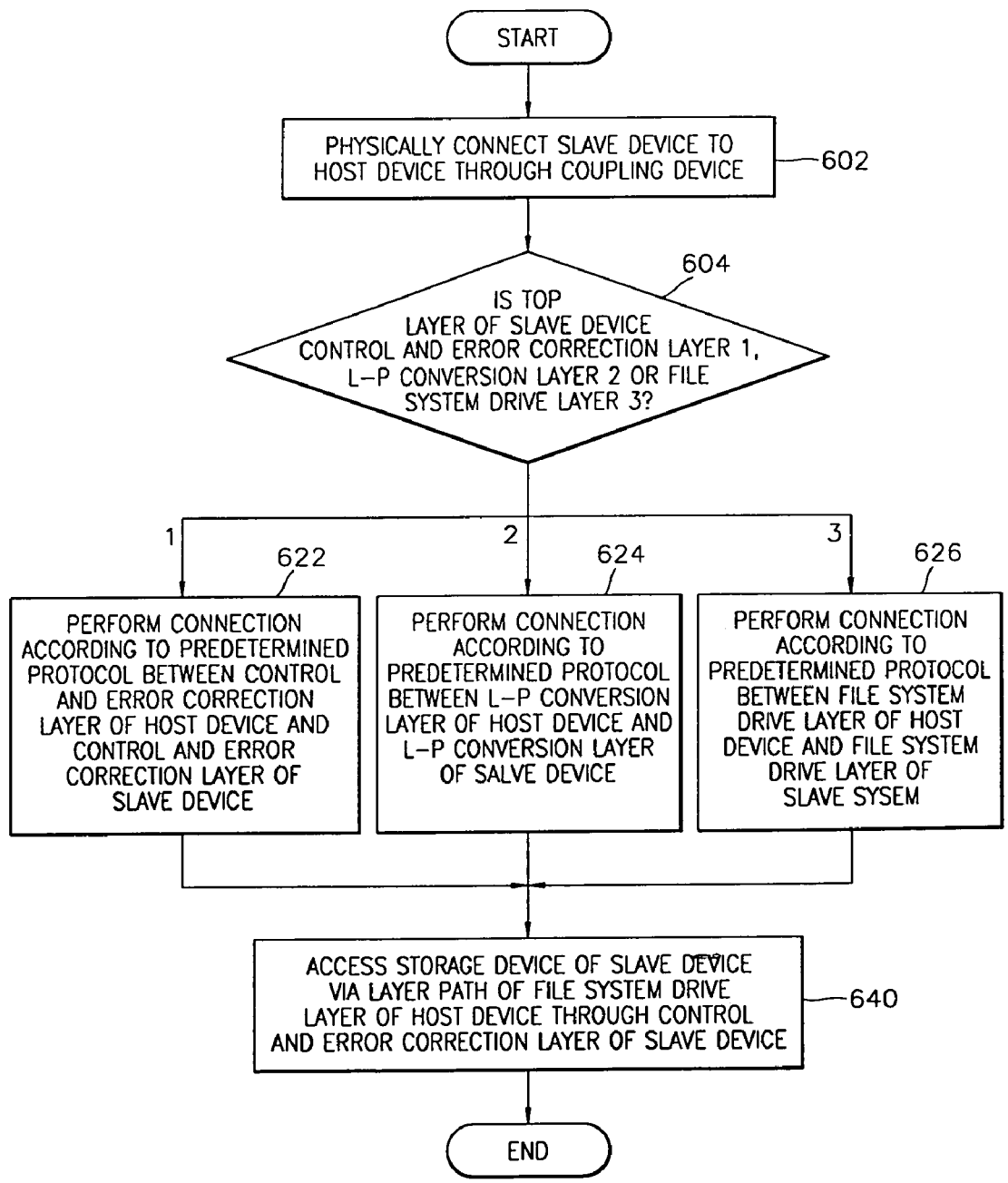

SLAVE DEVICE AND DATA SHARING METHOD

BACKGROUND OF THE INVENTION

1. Field of the Invention

The present invention relates to a slave device, and more particularly, to a slave device which is connected to a host device and shares a storage device with the host device.

2. Description of the Related Art

As memories, particularly, non-volatile memories such as flash memories, increase in capacity and decrease in size, the memory capacity of peripheral equipment such as digital cameras, MP3 players, music video players and portable data terminals tends to increase. Moreover, in the case where an image taken by a digital camera is downloaded to a host device such as a personal computer, or the case where an MP3 file stored in a host device is transmitted to an MP3 player, data stored in the storage device of a terminal must be shared with a host.

Hereinafter, a computer device is referred to as a host device, and devices such as terminals, zip drives, MP3 players and digital still cameras that are connected to the host device are referred to as slave devices.

FIG. 1A is a block diagram showing an example of the connection between a host device and a storage device according to the prior art. Referring to FIG. 1A, a detachable storage device is connected to a host device. The host device includes a file system. The file system of the host device is connected to the storage device by a coupling device. The storage device is realized as a detachable or external storage device. When this storage device is connected to the host device by the physical coupling device, application programs within the host device can use the storage device in the same manner of using a storage device within the host device through the file system of the host device.

FIG. 1B shows a case in which a host device is connected to a slave device including a storage device. Referring to FIG. 1B, a slave device includes a storage device therein. In this case, the host device uses an application program to perform connection to the slave device.

For example, a digital camera is connected to a personal computer by a serial type of coupling device. Image data stored in the storage device of the digital camera is read by the personal computer using an application program, which is provided by a digital camera manufacturing company for the connection between a digital camera and a personal computer. In other words, the host device has application program for a corresponding slave device in order to share data with the storage device of the slave device. Accordingly, conventional technology is disadvantageous in that a host device must have an application program which is exclusively used with a corresponding slave device in order to share the storage device of the slave device. In addition, conventional technology has a problem in that it is difficult to use a universal application program when a host device shares the storage devices of a plurality of slave devices.

SUMMARY OF THE INVENTION

To solve the above problem, a first object of the present invention is to provide a slave device with a storage device, in which data in the storage device can be shared by a host device using a universal application program.

A second object of the present invention is to provide a host device having a file system which allows the host device to share data in the storage device of a slave device.

A third object of the present invention is to provide a data sharing method for sharing the storage device of a slave device using a universal application program.

To achieve the first object of the invention, there is provided a slave device which has a storage device and is connected to a host device through predetermined coupling means. The slave device includes a media driver for performing connection to a file system of the host device according to a predetermined protocol such that at least part of the storage device operates as a storage device of the host device.

Preferably, the media driver includes a control and error correction unit for controlling the storage device and detecting and correcting errors.

Preferably, the control and error correction unit includes a predetermined protocol layer for performing connection to a control and error correction unit of the host device.

Preferably, the media driver also includes a logical-to-physical converter for converting logical location information used by the file system into physical location information.

Preferably, the logical-to-physical converter includes a predetermined protocol layer for performing connection to a logical-to-physical converter of the host device.

Preferably, the media driver also includes a file system driver for abstracting data stored in the storage device of the slave device to allow application programs to access the data as a file using the logical location information.

Preferably, the file system driver includes a predetermined protocol layer for performing connection to a file system driver of the host device.

To achieve the second object of the invention, there is provided a host device connected to a slave device having a storage device through a predetermined coupling device. The host device includes a file system for performing connection to the top layer of the slave device according to a predetermined protocol such that at least part of the storage device of the slave device operates as a storage device of the host device.

To achieve the third object of the invention, there is provided a data sharing method between a host device and a slave device, includes the steps of (a) physically connecting the host device to the slave device through predetermined coupling means, (b) performing the connection between the host device and the slave device according to a predetermined protocol between a top layer of the slave device and a file system of the host device such that at least part of a storage device of the slave device operates as a storage device of the host device, and (c) accessing the storage device of the slave device by the host device through the file system of the host device, the top layer of the slave device and a bottom layer of the slave system.

BRIEF DESCRIPTION OF THE DRAWINGS

The above objects and advantages of the present invention will become more apparent by describing in detail preferred embodiments thereof with reference to the attached drawings in which:

FIG. 6 is a flowchart of a data sharing method between a host device and a slave device according to an embodiment of the present invention.

DETAILED DESCRIPTION OF THE INVENTION

Figure 1A:
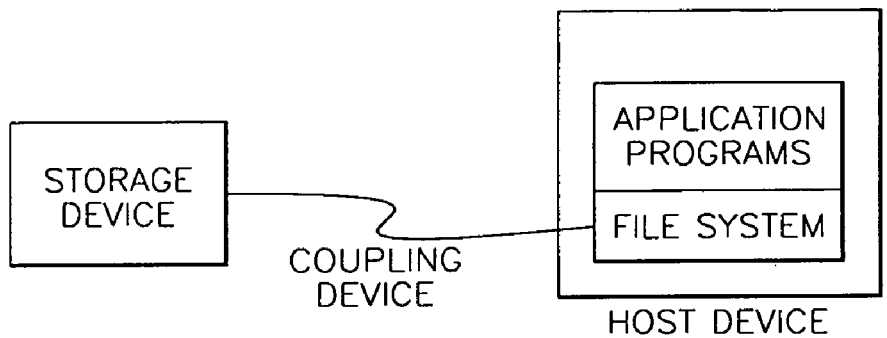
FIG. 1A is a block diagram showing an example of the connection between a host device and a storage device according to the prior art.
Figure 1B:
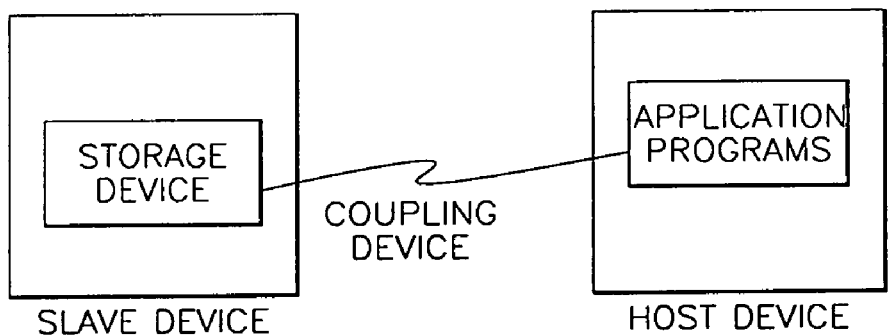
FIG. 1B is a block diagram showing an example of the connection between a host device and the storage device of a slave device according to the prior art.

Hereinafter, embodiments of the present invention will be described in detail with reference to the attached drawings. In the drawings, the same reference numerals denote the same member.

Figure 2:
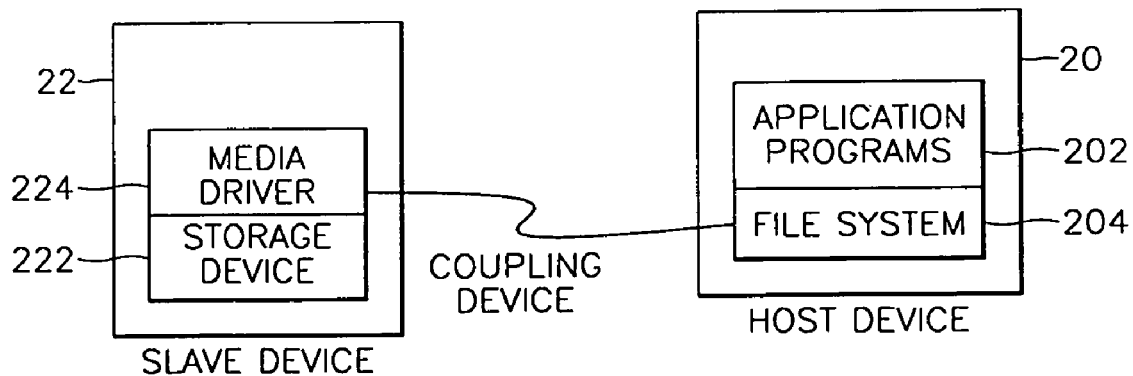
FIG. 2 is a block diagram for explaining the connection between a slave device and a host device according to an embodiment of the present invention.

Referring to FIG. 2, a slave device 22 according to the present invention includes a storage device 222 and a media driver 224. The media driver 224 of the slave device 22 is connected to a file system 204 of a host device 20 by a predetermined coupling device.

The media driver 224 performs connection to the file system 204 of the host device 20 according to a predetermined protocol. Since the storage device 222 of the slave device 22 is connected to the file system 204 of the host device 20 via the media driver 224, at least part of the storage device 222 of the slave device 22 operates as a storage device of the host device 20 when a universal application program is used.

The media driver 224 of the slave device 22 has a logical protocol architecture for performing connection according to the predetermined protocol. The protocol architecture included in the media driver 224 of the slave device 22 may vary with the ability of the slave device 22. In other words, a procedure of connection to the host device 20 varies with the protocol architecture within the media driver 224 of the slave device 22. Accordingly, the file system 204 of the host device 20 preferably includes a top layer identification unit (not shown) for identifying the top layer of the slave device 22 when initialization for connection with the slave device is performed.

Figure 3:
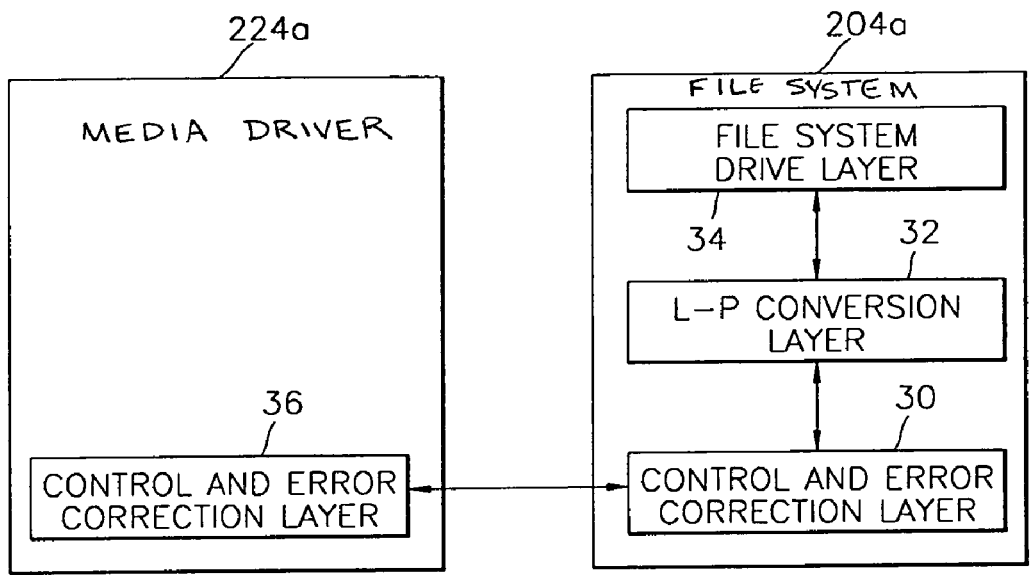
FIGS. 3 through 5 are block diagrams for explaining the procedure of connection between a slave device and a host device, which varies with a protocol architecture included in the media driver of the slave device, according to an embodiment of the present invention.

FIG. 3 shows an embodiment of the present invention in which a media driver 224a of the slave device 22 of FIG. 2 includes only a control and error correction layer 36 for controlling the storage device 222 and detecting and correcting errors. A protocol architecture included in a file system 204a of the host device 20 connected with the slave device 22 is composed of a control and error correction layer 30 for detecting and correcting errors, a logical-to-physical (L-P) conversion layer 32 for converting logical location information used by the file system 204 into physical location information, and a file system drive layer 34 for abstracting data stored in the storage device 222 to allow the application program 202 to access the data as a file using the logical location information.

In this case, the slave device 22 is logically connected to the host device 20 according to a predetermined protocol between the control and error correction layer 36 of the slave device 22 and the control and error correction layer 30 of the host device 20. Accordingly, data from the control and error correction layer 36 in the slave device 22 is transmitted to the application program 202 via the control and error correction layer 30, the L-P conversion layer 32 and the file system drive layer 34 in the host device 20.

Figure 4:
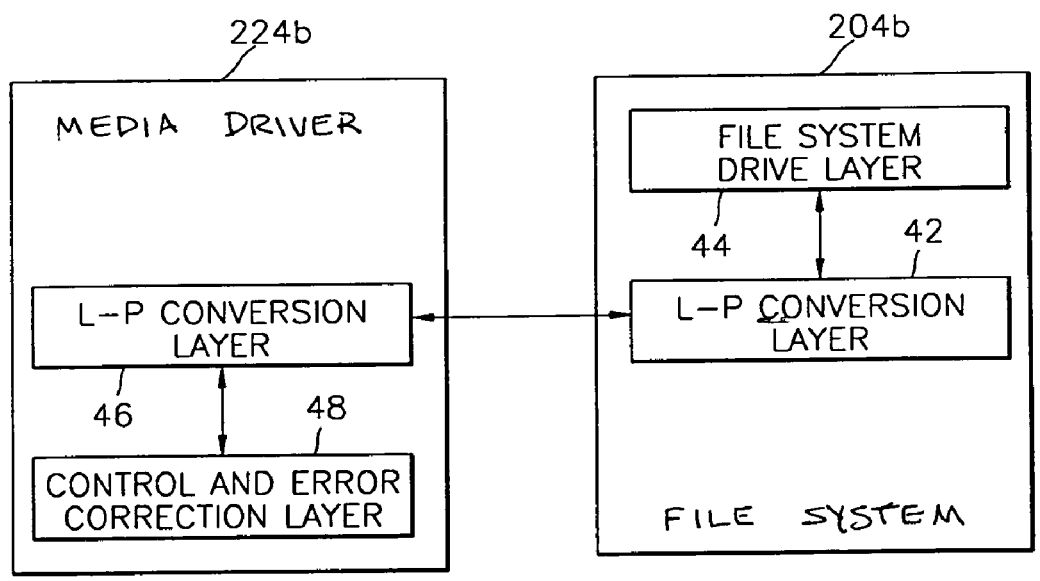

FIG. 4 shows another embodiment of the present invention, in which a media driver 224b of the slave device 22 includes a L-P conversion layer 46 for converting logical location information used by the file system 204 into physical location information and a control and error correction layer 48 for controlling the storage device 222 and detecting and correcting errors. A protocol architecture included in a file system 204b of the host device 20 includes a L-P conversion layer 42 and a file system drive layer 44.

In this case, the slave device 22 is logically connected to the host device 20 according to a predetermined protocol between the L-P conversion layer 46 of the slave device 22 and the L-P conversion layer 42 of the host device 20. Accordingly, data transmitted via the control and error correction layer 48 and the L-P conversion layer 46 in the slave device 22 is sent to the application program 202 via the L-P conversion layer 42 and file system drive layer 44 in the host device 20.

Figure 5:
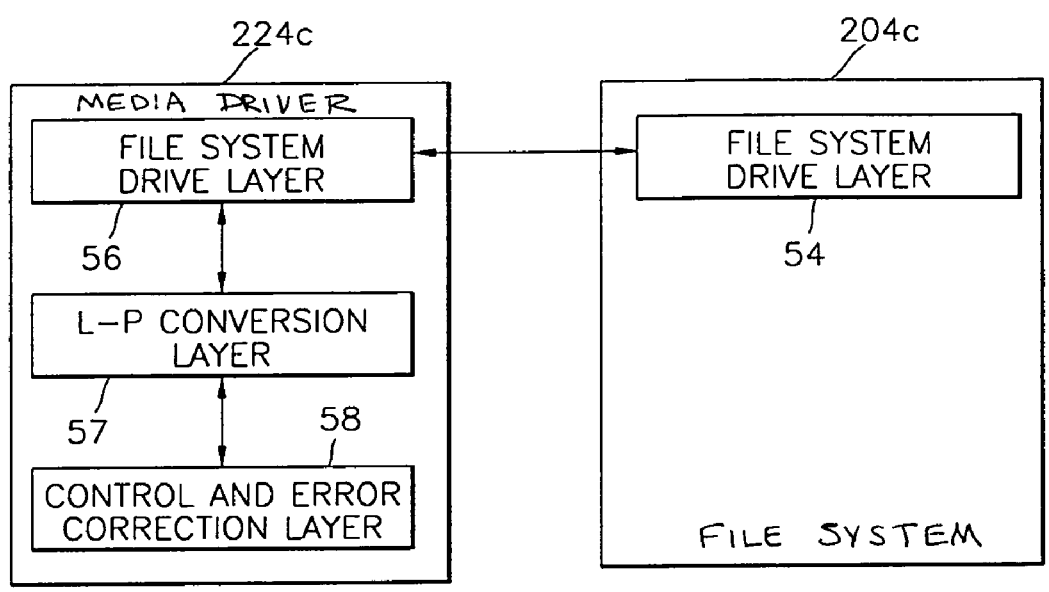

FIG. 5 shows another embodiment of the present invention, in which a media driver 224c of the slave device 22 includes a file system drive layer 56 for abstracting data stored in the storage device 222 to allow the application program 202 to access the data as a file using the logical location information, a L-P conversion layer 57 for converting logical location information used by the file system 204 into physical location information, and a control and error correction layer 58 for controlling the storage device 222 and detecting and correcting errors. A protocol architecture included in a file system 204c of the host device 20 includes only a file system drive layer 54.

In this case, the slave device 22 is logically connected to the host device 20 according to a predetermined protocol between the file system drive layer 56 of the slave device 22 and the file system drive layer 54 of the host device 20. Accordingly, data transmitted via the control and error correction layer 58, the L-P conversion layer 57 and the file system drive layer 56 in the slave device 22 is sent to the application program 202 via the file system drive layer 54 in the host device 20.

It will be understood by those skilled in the art that a protocol architecture included in any of the media drivers 224, 224a, 224b and 224c in the slave device 22 can be realized as a program. This program may be stored in ROM within a device or downloaded from outside the device. In addition, this program may be stored in a recording medium such as a magnetic recording medium or an optical recording medium. An embedded system or a terminal which executes the program includes a central processing unit (CPU) such as a microcomputer.

Meanwhile, a host device of the present invention, which is connected to a slave device including a storage device, includes a file system for performing connection with the top layer of the slave device according to a predetermined protocol such that at least part of the storage device of the slave device operates as a storage device of the host device. Preferably, the file system selectively includes one or more protocol layers among a control and error correction layer for detecting and correcting errors, a L-P conversion layer for converting logical location information used by the file system into physical location information, and a file system drive layer for abstracting data stored in the storage device of the slave device to allow application programs to access the data as a file using the logical location information. It is preferable that protocol layers including the top layer and other lower layers are selectively included in the file system. The file system of the host device may be realized as a driver program. If the protocol architectures in all slave and host devices are unified, storage devices in all slaves can be accessed using a single host device driver program regardless of the function of a slave device.

With reference to FIG. 6, a data sharing method between a host device and a slave device according to the present invention will be described. First, a slave device is physically connected to a host device through a predetermined coupling device in step 602. Next, it is preferable to identify the top layer of the slave device in step 604. Then, connection between the top layer of the slave device and the file system of the host device is performed according to a predetermined protocol such that at least part of the storage device of the slave device can operate as the storage device of the host device, and the host device accesses the storage device of the slave device via the file system of the host device, the top layer of the slave device and the bottom layer of the slave device.

If the top layer of the slave device is identified as a control and error correction layer which detects and corrects errors in step 604, connection is performed according to a predetermined protocol between the control and error correction layer, which controls the storage device and detects and corrects errors, of the host device and the control and error correction layer of the slave device in step 622.

If the top layer of the slave device is identified as a L-P conversion layer which converts logical location information used by a file system into physical location information in step 604, connection is performed according to a predetermined protocol between the L-P conversion layer, which converts logical location information used by a file system into physical location information, of the host device and the L-P conversion layer of the slave device in step 624.

If the top layer of the slave device is identified as a file system drive layer which abstracts data stored in the storage device to allow application programs to access the data as a file using logical location information in step 604, connection is performed according to a predetermined protocol between the file system drive layer of the host device and the file system drive layer of the slave device in step 626.

Thereafter, the host device accesses the storage device of the slave device via a layer path of the file system drive layer of the host device through the control and error correction layer of the slave device in step 640.

According to the present invention, at least part of the storage device of the slave device operates as the storage device of the host device when a universal application program is used. In other words, since the storage device within the slave device is regarded as the storage device of the host device, an application program can be made using a standardized application programming interface (API) for use of ordinary files. Therefore, the present invention facilitates formation of an application program and allows formation of an independent application program regardless of the type of slave device. In addition, according to the present invention, files, which are not related to the function of the slave device, can be stored in the storage device of the slave device to carry the files, and those files can be conveniently processed by a host system.

As described above, according to the present invention, a storage device within a slave device is regarded as the storage device of a host device, so that an application program can be easily made using a standardized application programming interface, and the storage device of the slave device can be shared by the host device using a universal application.

What is claimed is:

1. A portable slave device which is connected through a predetermined coupling device to a host device comprising a file system and an application program, the slave device comprising:

a media driver for performing connection to the file system of the host device via the predetermined coupling device according to a predetermined protocol, wherein the media driver comprises at least one of a control and error correction layer, a logical-to-physical conversion layer and a file system drive layer; and a storage device which is connected to the file system of the host device via the media driver, wherein at least a portion of the storage device operates as a storage device of the host device when the application program is used by the host device, wherein the media device is logically connected to the file system according to a predetermined protocol between one of (a) the control and error correction layer of the media driver and a control and error correction layer of the file system such that data is transmitted from the control and error correction layer of the media driver of the slave device to the application program of the host device via the control and error correction layer of the file system of the host device, (b) the logical-to-physical conversion layer of the media driver and a logical-to-physical conversion layer of the file system of the host device such that data is transmitted from the control and error correction layer and the logical-to-physical conversion layer of the media driver of the slave device to the application program via the logical-to-physical conversion layer and file system drive layer of the file system of the host device, and (c) the file system drive layer of the media driver and a file system drive layer of the file system of the host device such that data transmitted via the control and error correction layer, the logical-to-physical conversion layer and the file system drive layer of the media driver of the slave device is sent to the application program via the file system drive layer of the file system of the host device.

2. The slave device of claim 1, wherein the control and error correction unit of the media driver controls the storage device and detects and corrects errors.

3. The slave device of claim 2, wherein the logical-to-physical converter of the media driver converts logical location information used by the file system into physical location information.

4. The slave device of claim 3, wherein the file system driver of the media driver abstracts data stored in the storage device of the slave device to allow the application program to access the data stored in the storage device as a file using the logical location information.

5. The slave device of claim 1, wherein the slave device is a portable data terminal, zip drive, MP3 player or digital camera, and the host device is a personal computer.

6. A host device connected to a portable slave device comprising a storage device through a predetermined coupling device, the host device comprising a file system for performing connection to a top layer of the slave device according to a predetermined protocol so that at least a portion of the storage device of the slave device operates as a storage device of the host device, wherein the file system comprises:

a control and error correction layer for detecting and correcting errors;

a logical-to-physical conversion layer for converting logical location information used by the file system into physical location information; and a file system drive layer for abstracting data stored in the storage device of the slave device to allow application programs to access the data as a file using the logical location information.

7. The host device of claim 6, further comprising a top layer identification unit for identifying the top layer of the slave device during initialization for connection to the slave device.

8. A portable slave device which is connected through a predetermined coupling device to a host device comprising a file system and an application program, the slave device comprising:

a media driver for performing connection to the file system of the host device via the predetermined coupling device according to a predetermined protocol; and a storage device which is connected to the file system of the host device via the media driver, wherein at least a portion of the storage device operates as a storage device of the host device when the application program is used by the host device, wherein the file system of the host device comprises a control and error correction layer, a logical-to-physical conversion layer, and a file system drive layer, the media driver comprises a control and error correction layer, and the slave device is logically connected to the host device according to a predetermined protocol between the control and error correction layer of the media driver of the slave device and the control and error correction layer of the file system of the host device such that data is transmitted from the control and error correction layer of the media driver of the slave device to the application program of the host device via the control and error correction layer, the logical-to-physical conversion layer and the file system drive layer of the file system of the host device.

9. A portable slave device which is connected through a predetermined coupling device to a host device comprising a file system and an application program, the slave device comprising:

a media driver for performing connection to the file system of the host device via the predetermined coupling device according to a predetermined protocol; and a storage device which is connected to the file system of the host device via the media driver, wherein at least a portion of the storage device operates as a storage device of the host device when the application program is used by the host device, wherein the file system of the host device comprises a logical-to-physical conversion layer and a file system drive layer, the media driver comprises a control and error correction layer and a logical-to-physical conversion layer, and the slave device is logically connected to the host device according to a predetermined protocol between the logical-to-physical conversion layer of the media driver of the slave device and the logical-to-physical conversion layer of the file system of the host device such that data is transmitted from the control and error correction layer and the logical-to-physical conversion layer of the media driver of the slave device to the application program via the logical-to-physical conversion layer and file system drive layer of the file system of the host device.

10. A portable slave device which is connected through a predetermined coupling device to a host device comprising a file system and an application program, the slave device comprising:

a media driver for performing connection to the file system of the host device via the predetermined coupling device according to a predetermined protocol; and a storage device which is connected to the file system of the host device via the media driver, wherein at least a portion of the storage device operates as a storage device of the host device when the application program is used by the host device, wherein the file system of the host device comprises a file system drive layer, the media driver comprises a control and error correction layer, a logical-to-physical conversion layer, and a file system drive layer, and the slave device is logically connected to the host device according to a predetermined protocol between the file system drive layer of the media driver of the slave device and the file system drive layer of the file system of the host device such that data transmitted via the control and error correction layer, the logical-to-physical conversion layer and the file system drive layer of the media driver of the slave device is sent to the application program via the file system drive layer of the file system of the host device.

11. A host device connected to a portable slave device comprising a storage device through a predetermined coupling device, the host device comprising:

a file system for performing connection to a top layer of the slave device according to a predetermined protocol so that at least a portion of the storage device of the slave device operates as a storage device of the host device; and an application program, wherein the file system of the host device comprises a control and error correction layer, a logical-to-physical conversion layer, and a file system drive layer, the slave device comprises a media driver including a control and error correction layer, and the host device is logically connected to the slave device according to a predetermined protocol between the control and error correction layer of the media driver of the slave device and the control and error correction layer of the file system of the host device such that data is transmitted from the control and error correction layer of the media driver of the slave device to the application program of the host device via the control and error correction layer, the logical-to-physical conversion layer and the file system drive layer of the file system of the host device.

12. A host device connected to a portable slave device comprising a storage device through a predetermined coupling device, the host device comprising:

a file system for performing connection to a top layer of the slave device according to a predetermined protocol so that at least a portion of the storage device of the slave device operates as a storage device of the host device; and an application program, wherein the file system of the host device comprises a logical-to-physical conversion layer and a file system drive layer, the media driver comprises a media driver including a control and error correction layer and a logical-to-physical conversion layer, and the host device is logically connected to the slave device according to a predetermined protocol between the logical-to-physical conversion layer of the media driver of the slave device and the logical-to-physical conversion layer of the file system of the host device such that data is transmitted from the control and error correction layer and the logical-to-physical conversion layer of the media driver of the slave device to the application program via the logical-to-physical conversion layer and file system drive layer of the file system of the host device.

13. A host device connected to a portable slave device comprising a storage device through a predetermined coupling device, the host device comprising:
   a file system for performing connection to a top layer of the slave device according to a predetermined protocol so that at least a portion of the storage device of the slave device operates as a storage device of the host device; and
   an application program, wherein the file system of the host device comprises a file system drive layer, the media driver comprises a control and error correction layer, a logical-to-physical conversion layer, and a file system drive layer, and the host device is logically connected to the slave device according to a predetermined protocol between the file system drive layer of the media driver of the slave device and the file system drive layer of the file system of the host device such that data transmitted via the control and error correction layer, the logical-to-physical conversion layer and the file system drive layer of the media driver of the slave device is sent to the application program via the file system drive layer of the file system of the host device.

14. A data sharing method between a host device and a portable slave device, wherein the host device comprises an application program and a file system which includes a control and error correction layer, a logical-to-physical conversion layer and a file system drive layer, and the slave device comprises a media driver including a control and error correction layer, the method comprising the steps of:
   (a) physically connecting the host device to the slave device through predetermined coupling device;
   (b) performing connection between the host device and the slave device according to a predetermined protocol between a top layer of the slave device and the file system of the host device so that at least part of a storage device of the slave device operates as a storage device of the host device; and
   (c) accessing the storage device of the slave device by the host device via the file system of the host device, the top layer of the slave device and a bottom layer of the slave system,
   wherein step (b) comprises performing connection between the host device and the slave device according to a predetermined protocol between the control and error correction layer of the media driver of the slave device and the control and error correction layer of the file system of the host device, and
   wherein step (c) comprises transmitting data from the control and error correction layer of the media driver of the slave device to the application program of the host device via the control and error correction layer, the logical-to-physical conversion layer and the file system drive layer of the file system of the host device.

15. A data sharing method between a host device and a portable slave device, wherein the host device comprises an application program and a file system which includes a file system drive layer, and the slave device comprises a media driver including a control and error correction layer, a logical-to-physical conversion layer and a file system drive layer, the method comprising the steps of:
   (a) physically connecting the host device to the slave device through predetermined coupling device;
   (b) performing connection between the host device and the slave device according to a predetermined protocol between a top layer of the slave device and the file system of the host device so that at least part of a storage device of the slave device operates as a storage device of the host device; and
   (c) accessing the storage device of the slave device by the host device via the file system of the host device, the top layer of the slave device and a bottom layer of the slave system,
   wherein step (b) comprises performing connection between the host device and the slave device according to a predetermined protocol between the file system drive layer of the media driver of the slave device and the file system drive layer of the file system of the host device, and
   wherein step (c) comprises transmitting data from the control and error correction layer, the logical-to-physical conversion layer and the file system drive layer of the media driver of the slave device to the application program via the file system drive layer of the file system of the host device.

16. A data sharing method between a host device and a portable slave device, wherein the host device comprises an application program and a file system which includes a logical-to-physical conversion layer and a file system drive layer, and the slave device comprises a media driver including a control and error correction layer and a logical-to-physical conversion layer, the method comprising the steps of:
   (a) physically connecting the host device to the slave device through predetermined coupling device;
   (b) performing connection between the host device and the slave device according to a predetermined protocol between a top layer of the slave device and the file system of the host device so that at least part of a storage device of the slave device operates as a storage device of the host device; and
   (c) accessing the storage device of the slave device by the host device via the file system of the host device, the top layer of the slave device and a bottom layer of the slave system,
   wherein step (b) comprises performing connection between the host device and the slave device according to a predetermined protocol between the logical-to-physical conversion layer of the media driver of the slave device and the logical-to-physical conversion layer of the file system of the host device, and
   wherein step (c) comprises transmitting data from the control and error correction layer and the logical-to-physical conversion layer of the media driver of the slave device to the application program via the logical-to-physical conversion layer and file system drive layer of the file system of the host device.

* * * * *